United States Patent

Chow

[15] 3,646,530

[45] Feb. 29, 1972

[54] INPUT GATE ARRANGEMENT FOR DOMAIN WALL DEVICE

[72] Inventor: Woo Foung Chow, Berkeley Heights, N.J.

[73] Assignee: Bell Telephone Laboratories, Incorporated, Murray Hill, Berkeley Heights, N.J.

[22] Filed: Sept. 30, 1970

[21] Appl. No.: 76,882

[52] U.S. Cl. ..............340/174 TF, 340/174 VA, 340/174 SR

[51] Int. Cl. ....................................G11c 19/00, G11c 11/14

[58] Field of Search ............179/18 FF; 340/174 TF, 174 VA

[56] References Cited

UNITED STATES PATENTS 3,518,643 6/1970 Perneski ...........................340/174 TF 3,553,661 1/1971 Hadden, Jr. .......................340/174 TF 3,516,077 6/1970 Bobeck et al. ...................340/174 TF

*Primary Examiner*—Stanley M. Urynowicz, Jr.

*Attorney*—R. J. Guenther and Kenneth B. Hamlin

[57] ABSTRACT

A first multistage domain shift register, of the type in which a domain is moved along a rail which defines the register, is employed in an input gate arrangement for an autonomous line scanner. Information in such a register is represented by a domain in one of two possible positions laterally displaced with respect to one another to a first and second side of the rail in each stage. A second rail parallels the first and is responsive to input (off-hook) signals to determine the lateral positions of domains there for interaction with and thus for determination of the lateral positions of domains in the first register.

9 Claims, 2 Drawing Figures

INVENTOR
W. F. CHOW
BY Herbert M. Shapiro
ATTORNEY

INPUT GATE ARRANGEMENT FOR DOMAIN WALL DEVICE

FIELD OF THE INVENTION

This invention relates to data processing arrangements, particularly arrangements which employ single wall domain propagation devices.

BACKGROUND OF THE INVENTION

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields for moving domains are often provided by an array of conductors pulsed individually by external drivers. The shape of the conductors is dictated by the shape of the domain and by the material parameters. Most materials suitable for the movement of single wall domains exhibit a preferred direction of magnetization normal to the plane of movement and are magnetically isotropic in the plane. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in such a manner is disclosed in U.S. Pat. No. 3,460,116 of A. H. Bobeck, U. F. Gianola, R. C. Sherwood, and W. Shockley, issued Aug. 5, 1969.

Copending application Ser. No. 049,273, filed June 24, 1970 for J. A. Copeland III describes an alternative domain propagation arrangement in which domains move through a succession of stages along a magnetically soft rail from input to output positions. The rail has a geometry to define in each stage a stable position for a domain to either side of the rail permitting a domain to one side of the rail to represent a binary 0 and one to the other side to represent a binary 1.

Magnetic domain wall shift registers appear particularly well suited for performing the function of scanning the conditions of a number of lines. The use of domain shift registers in a telephone line scanner is disclosed, for example, in U.S. Pat. No. 3,430,001 of U. F. Gianola, R. A. Kaenel, and H. E. D. Scovil, issued Feb. 25, 1969. One problem with respect to such a use is that the scanned lines often exhibit continuing currents which effect the operation of the shift register and are advantageously decoupled from the shift register after each scan operation.

BRIEF DESCRIPTION OF THE INVENTION

The present invention is an adaptation of the rail shift register arrangement described in the copending application of J. A. Copeland III mentioned above. The adaptation includes not only a first rail register as described in that application but also an auxiliary magnetically soft rail to which scanned lines are directly coupled. Domains are stored permanently along the auxiliary rail to be moved only laterally to first and second sides thereof to reflect the signal pattern of the scanned lines. For example, during a scan operation, each of those scanned lines in which a current flows, moves a corresponding domain from a first to a second side of the auxiliary rail. Domains to the first side of the first rail register interact, during a scan operation, with domains to the second side of the auxiliary register in a manner to cause movement of the former to the second side of the rail in the first rail register. The pattern of domains to the first side of the rail in first rail register represents the pattern of active lines in the absence of direct coupling of the scanned lines to the first rail register.

DETAILED DESCRIPTION

Figure 1:
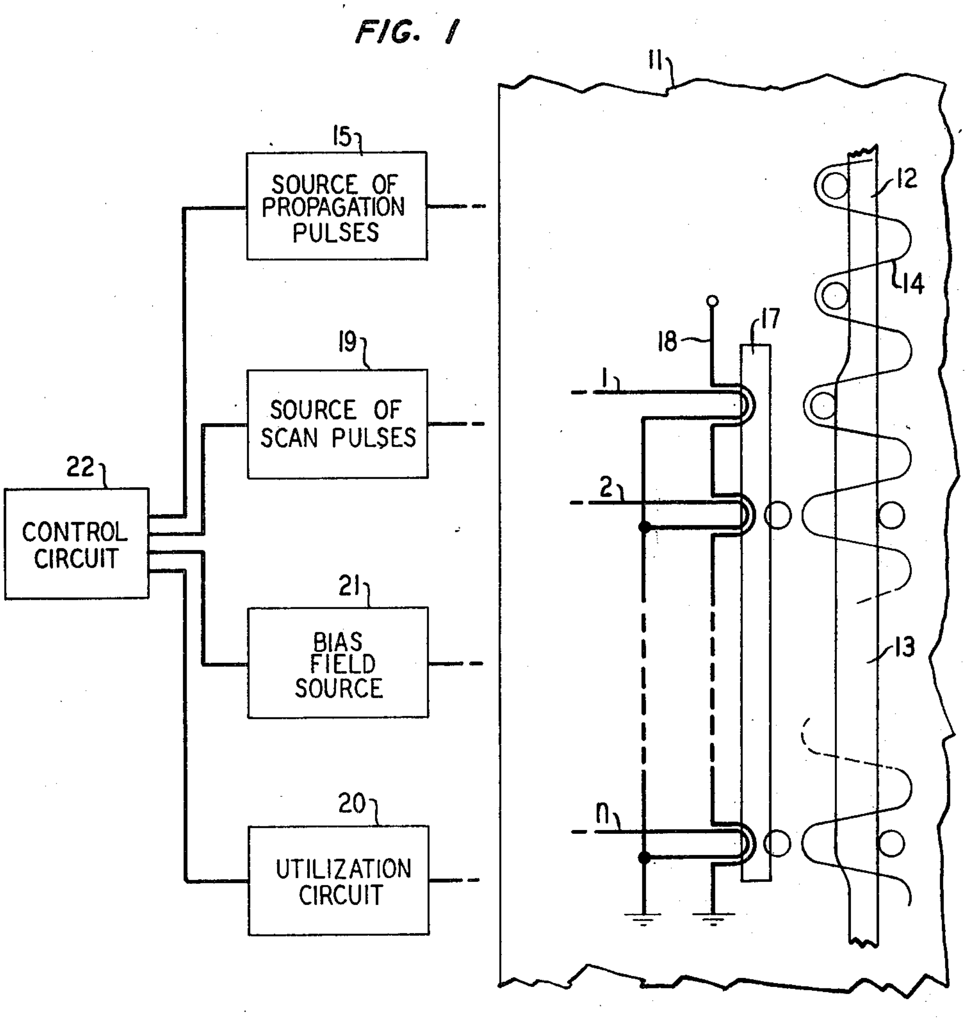
FIG. 1 is a schematic illustration of an input gate arrangement in accordance with this invention.

FIG. 1 shows a single wall domain input gate arrangement in accordance with this invention for a domain wall shift register channel. The arrangement comprises a sheet or slice 11 of a material in which single wall domains can be moved. The arrangement may be thought of as operative to scan the conditions of a number of input lines in a manner consistent with the general organization disclosed in the above-mentioned patent of U. F. Gianola et al. For simplicity, the shift register along which domains are moved in such an operation will be assumed to be a closed loop register which recirculates domains in a manner clear from the above-mentioned copending patent application of J. A. Copeland III.

The shift register channel is defined by a rail 12 shown in FIG. 1. Rail 12 illustratively comprises a magnetically soft film conveniently having a closed loop geometry including a control portion 13 which may be thought of as an input position. We will confine our attention herein solely to the organization and operation of the gate arrangement at such a control portion in accordance with this invention. Only so much of rail 12 beyond the control portion is shown as is necessary to indicate a widening of the rail at the control portion for reasons explained hereinafter.

A representative conductor 14 loops back and forth, illustratively, to provide magnetic field patterns for advancing domains from stage to stage along rail 12. In practice, two such conductors are offset from one another along the rail for producing the domain movement. Each such conductor is connected between a source of propagation pulses represented in FIG. 1 by a block 15 so designated.

The domains so recirculated are placed in coded positions to first and second sides of rail 12 at the control portion 13. The control arrangement comprises a second magnetically soft overlay rail 17 which parallels control (input) portion 13. Rail 17 has a geometry to define stable positions for domains to either side thereof as does rail 12. A number of lines, 1, 2...*n*, to be scanned are coupled to consecutive positions along rail 17. In addition, a control electrical conductor 18 is coupled serially to the stages (consecutive domain positions) along rail 17. Conductor 18 is connected between a source of scan pulses represented in FIG. 1 by a block 19 so designated.

In operation, each position along rail 17 coupled by a line 1...*n* normally has a domain to the left (first side) of the rail as viewed in FIG. 1. Also, in the illustrative recirculating register the stages of control portion 13, as well as all positions along rail 12, are filled with domains, those of control portion 13 being to the left (first side) of the rail there. The direction of movement of domains along rail 12 is downward as viewed in FIG. 1. When a scan operation is initiated, domain movement along 12 is terminated.

The presence of a signal on an input line (1 through *n*) appears as a current flowing in the line of a polarity to attract a domain in the left side of rail 17. A scan operation is initiated by a pulse on conductor 18 of a polarity opposite to that of the currents in the scanned lines and of equal amplitude, illustratively. In only those positions along rail 17 where the scanned lines have no currents are the associated domains repelled to the right (second) side of the rail by the field generated by the current in conductor 18. In turn, the correspondingly disposed domains along rail 12 are displaced to the right (second side) of rail 12.

Figure 2:
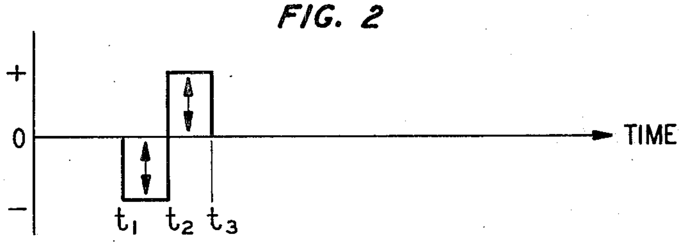
FIG. 2 is a pulse diagram for the input operation of the arrangement of FIG. 1.

The pulse in conductor 18 is then reversed, moving domains associated with inactive scanned lines back to the left of rail 17 thereof while domains associated with those lines which include currents remain to the right of rail 12 at control portion 13. The scan pulse sequence is illustrated in FIG. 2, initiated at time $t1$ by a pulse on conductor 18. The pulse is reversed at time $t2$ and terminated at time $t3$ at which time the scan operation is complete.

It is to be noted that domains are not moved along the axis of rail 17. Rather, they are selectively displaced laterally across rail 17, each remaining permanently associated with a particular input line. On the other hand, domains to the left and right of rail 12 are moved therealong in a manner described in the above-mentioned copending application of J. A. Copeland III once the scan operation is complete.

Domains so displaced along rail 12 advance to an output position where they are detected illustratively by apparatus which results in the movement of domains from the right to the left side of rail 13 during an interrogation operation. This is accomplished conveniently by an electrical pickup coil familiar in the art, or by interaction with domains in other channels (not shown) which could be defined in sheet 11. The interrogation operation results in the application of signals to a utilization circuit represented in FIG. 1 by block 20. Such an operation is consistent with that disclosed in the above-mentioned application of J. A. Copeland III.

Domains, represented by circles in FIG. 1, are conveniently maintained at some constant diameter by a bias field of a polarity to constrict domains as is well known. Block 21 of FIG. 1 represents a source of such a field.

Sources 15, 19, and 21 and circuit 20 are connected to a control circuit 22 for activation and synchronization. The various sources and circuits herein may be any such elements capable of operating in accordance with this invention.

The control portion 13 of rail 12 is represented in FIG. 1 as being wider than that of the remainder of the rail. A widening of the rail lowers the force necessary to move a domain across the rail as is consistent with the teaching of the above-mentioned copending application of J. A. Copeland III. Ideally, the width of the control portion of the rail is greater than the width of the remainder of rail 12 by a factor of about 50 percent in order to achieve an adequate force reduction to permit domain interaction to cause rail crossings. Alternatively, the thickness of input portion 13 can be reduced for the same purpose.

In addition, rails 12 and 17 are disposed with respect to one another at control portion 13 to enable domains to the right of 17, as viewed in FIG. 1, to interact with domains to the left of 12 to cause the latter to crossrail 12 as described. Typically, for domains of radius R (equal to the sheet thickness), rails 12 and 17 are about 0.45 R wide for defining the requisite stable positions to either side thereof. Portion 13 is up to about 0.7 R wide and the separation between rails 12 and 17 at 13 is about 4 R.

Although the invention has been described in terms of rails of magnetically soft material, grooves in the surface of sheet 11 serve a like function as is also indicated in the above-mentioned copending application of J. A. Copeland III.

What has been described is considered merely illustrative of the principles of this invention. Accordingly, various alternatives may be devised by those skilled in the art in accordance with those principles within the spirit and scope of this invention.

What is claimed is:

1. A combination comprising a sheet of material in which single wall domains can be moved, a first rail energy coupled to said sheet extending between input and output positions, means for moving domains along said first rail from stage to stage from said input to said output position, said first rail having properties and a first geometry to define a stable position for a domain to first and second sides thereof in each of said stages, said first rail including a portion extending over a plurality of stages therealong and having a second geometry to permit domains to be moved thereacross in the presence of control domains, and control means for selectively providing a control domain at each stage of said first portion in a manner to move domains across said first rail at said portion selectively.

2. A combination in accordance with claim 1 wherein said control means comprises a second rail also having properties and a geometry to define stable positions to first and second sides thereof, said second rail being spaced apart from said first portion a distance to cause domains to move across said first portion in the presence of domains occupying corresponding positions to the second side of said second rail, and a plurality of electrical conductors coupled to said sheet along said second rail for moving domains between first and second sides thereof when pulsed.

3. A combination in accordance with claim 2 wherein each of said rails comprises a magnetically soft film.

4. A combination in accordance with claim 2 wherein each of said rails comprises a groove in said sheet.

5. A combination in accordance with claim 1 including input means for providing domains at said input position.

6. A combination in accordance with claim 3 wherein said first rail has a closed loop configuration for recirculating domains thereabout thereby providing domains at said input position.

7. A combination comprising a sheet of material in which single wall domains can be moved between input and output positions, a first rail adjacent said sheet and extending between said input and output positions, said rail having a first portion, a second rail adjacent said first portion, each of said first and second rails having properties and a thickness and width to define a stable location for a single wall domain to either side thereof, means for moving domains through a sequence of stages along a first or a second side of said first rail into said first portion, and means for selectively moving domains from said first to said second side of said second rail, said first portion being disposed and having an enlarged width to permit movement of domains from said first to said second side thereof in the presence of domains in corresponding positions to the second side of said second rail.

8. A combination in accordance with claim 7 wherein each of said rails comprises a film of magnetically soft material.

9. A combination in accordance with claim 8 wherein each of said rails comprises a groove in said sheet.

* * * * *